US011778065B2

(12) United States Patent
Landra et al.

(10) Patent No.: US 11,778,065 B2
(45) Date of Patent: *Oct. 3, 2023

(54) SYSTEM AND METHOD FOR LOAD MITIGATION IN REQUEST HANDLING

(71) Applicant: AMADEUS S.A.S., Biot (FR)

(72) Inventors: Corinne Francoise Pascale Landra, Biot (FR); Hervé Prezet, Biot (FR); Olivier Amadieu, Biot (FR); Catherine Bignotti, Biot (FR)

(73) Assignee: AMADEUS S.A.S., Biot (FR)

( * ) Notice: Subject to any disclaimer, the term of this patent is extended or adjusted under 35 U.S.C. 154(b) by 81 days.

This patent is subject to a terminal disclaimer.

(21) Appl. No.: 17/467,849

(22) Filed: Sep. 7, 2021

(65) Prior Publication Data

US 2021/0409507 A1 Dec. 30, 2021

Related U.S. Application Data

(63) Continuation of application No. 16/656,821, filed on Oct. 18, 2019, now Pat. No. 11,140,237.

(51) Int. Cl.
*H04L 29/08* (2006.01)
*H04L 67/568* (2022.01)
(Continued)

(52) U.S. Cl.
CPC ............ *H04L 67/568* (2022.05); *G06F 21/57* (2013.01); *G06Q 30/02* (2013.01); *H04L 67/1001* (2022.05)

(58) Field of Classification Search
CPC ........... H04L 67/2842; H04L 29/08144; H04L 67/1002; G06F 21/57; G06Q 30/02
See application file for complete search history.

(56) References Cited

U.S. PATENT DOCUMENTS

| 2002/0111822 A1* | 8/2002 | Shimizu | G08G 1/096775 |
| | | | 705/1.1 |
| 2002/0116282 A1* | 8/2002 | Martin | G06Q 20/202 |
| | | | 705/37 |

(Continued)

OTHER PUBLICATIONS

Landra, Corinne Francoise Pascale et al., "System and Method for Load Mitigation in Request Handling", U.S. Appl. No. 16/656,821, filed Oct. 18, 2019.

*Primary Examiner* — Aftab N. Khan
(74) *Attorney, Agent, or Firm* — Perry + Currier (57) ABSTRACT

A method includes receiving, at an intermediation server, from a requesting device, a request for one or more items provided by a provider system; generating, at the intermediation server, an intermediate reply comprising data indicative of the one or more items provided by the provider system; determining, at the intermediation server, whether the request is eligible for direct distribution; in response to determining that the request is eligible for direct distribution, generating, at the intermediation server, an adjusted reply by: communicating with a hosted offer management system to receive instructions for adjusting the intermediate reply, the hosted offer management system providing hosted provider object services for the provider system; and adjusting, at the intermediation server, the intermediate reply based on the instructions; and providing, from the intermediation server, to the requesting device, the adjusted reply in response to the request.

19 Claims, 8 Drawing Sheets

(51) Int. Cl.
 *G06Q 30/02* (2023.01)
 *G06F 21/57* (2013.01)
 *H04L 67/1001* (2022.01)

(56) References Cited

U.S. PATENT DOCUMENTS

| | | | | |
|---|---|---|---|---|
| 2002/0198790 | A1* | 12/2002 | Paulo | G06Q 30/0639 |
| | | | | 705/26.8 |
| 2008/0033845 | A1* | 2/2008 | McBride | G09B 5/00 |
| | | | | 705/28 |
| 2012/0089476 | A1* | 4/2012 | Walker | G06Q 20/085 |
| | | | | 705/26.4 |
| 2012/0289147 | A1* | 11/2012 | Raleigh | H04N 21/25808 |
| | | | | 455/3.06 |
| 2013/0024493 | A1* | 1/2013 | Salonen | H04L 51/214 |
| | | | | 709/202 |
| 2013/0110554 | A1* | 5/2013 | Rao | G06Q 40/08 |
| | | | | 705/4 |
| 2014/0180790 | A1* | 6/2014 | Boal | G06Q 30/0245 |
| | | | | 705/14.42 |
| 2014/0279352 | A1* | 9/2014 | Schaefer | G06Q 40/04 |
| | | | | 705/37 |
| 2016/0344831 | A1* | 11/2016 | Schneider | H04L 67/562 |
| 2016/0379248 | A1* | 12/2016 | Panaguiton Damian | |
| | | | | G06Q 30/0633 |
| | | | | 705/14.51 |
| 2018/0248964 | A1* | 8/2018 | Wei | H04L 67/56 |

* cited by examiner

SYSTEM AND METHOD FOR LOAD MITIGATION IN REQUEST HANDLING

CROSS-REFERENCE TO RELATED APPLICATIONS

This application is a continuation of U.S. patent application Ser. No. 16/656,821, filed Oct. 18, 2019, the contents of which are incorporated herein by reference.

FIELD

The specification relates generally to handling data requests in computing systems, and specifically to a system and method for load mitigation in such request handling.

BACKGROUND

Certain requests for generated or computed data, as opposed to existing data that need only be retrieved, occur in great numbers (e.g. tens of thousands per second), and are handled by a comparatively small number of computing systems. Examples of such requests are requests for available travel-related products and services (e.g. flights, hotel rooms and the like; flights are particularly vulnerable), directed to the computing systems of providers of such products. Responding directly to such requests by the providers' computing systems imposes substantial computational loads and associated costs. However, reducing those impacts by relying on a third party to respond to the requests based on data published to the third party periodically by the providers may decrease the accuracy of the responses.

SUMMARY

An aspect of the specification provides a method including: receiving, at an intermediation server, from a requesting device, a request for one or more items provided by a provider system; generating, at the intermediation server, an intermediate reply comprising data indicative of the one or more items provided by the provider system; determining, at the intermediation server, whether the request is eligible for direct distribution; in response to determining that the request is eligible for direct distribution, generating, at the intermediation server, an adjusted reply by: communicating with a hosted offer management system to receive instructions for adjusting the intermediate reply, the hosted offer management system providing hosted provider object services for the provider system; and adjusting, at the intermediation server, the intermediate reply based on the instructions; and providing, from the intermediation server, to the requesting device, the adjusted reply in response to the request.

Another aspect of the specification provides an intermediation server, comprising: a communications interface; and a processor connected with the communications interface, the processor configured to: receive from a requesting device via the communications interface, a request for one or more items provided by a provider system; generate an intermediate reply comprising data indicative of the one or more items provided by the provider system; determine whether the request is eligible for direct distribution; in response to a determination that the request is eligible for direct distribution: communicate with a hosted offer management system to receive instructions for adjusting the intermediate reply, the hosted offer management system providing hosted provider object services for the provider system; and adjust the intermediate reply based on the instructions to generate an adjusted reply; and provide to the requesting device via the communications interface, the adjusted reply in response to the request.

A further aspect of the specification provides a non-transitory computer-readable medium storing computer readable instructions executable by a processor of an intermediation server to: receive from a requesting device via a communications interface of the intermediation server, a request for one or more items provided by a provider system; generate an intermediate reply comprising data indicative of the one or more items provided by the provider system; determine whether the request is eligible for direct distribution; in response to a determination that the request is eligible for direct distribution: communicate with a hosted offer management system to receive instructions for adjusting the intermediate reply, the hosted offer management system providing hosted provider object services for the provider system; and adjust the intermediate reply based on the instructions to generate an adjusted reply; and provide to the requesting device via the communications interface, the adjusted reply in response to the request.

BRIEF DESCRIPTIONS OF THE DRAWINGS

Embodiments are described with reference to the following figures, in which.

DETAILED DESCRIPTION

Figure 1:
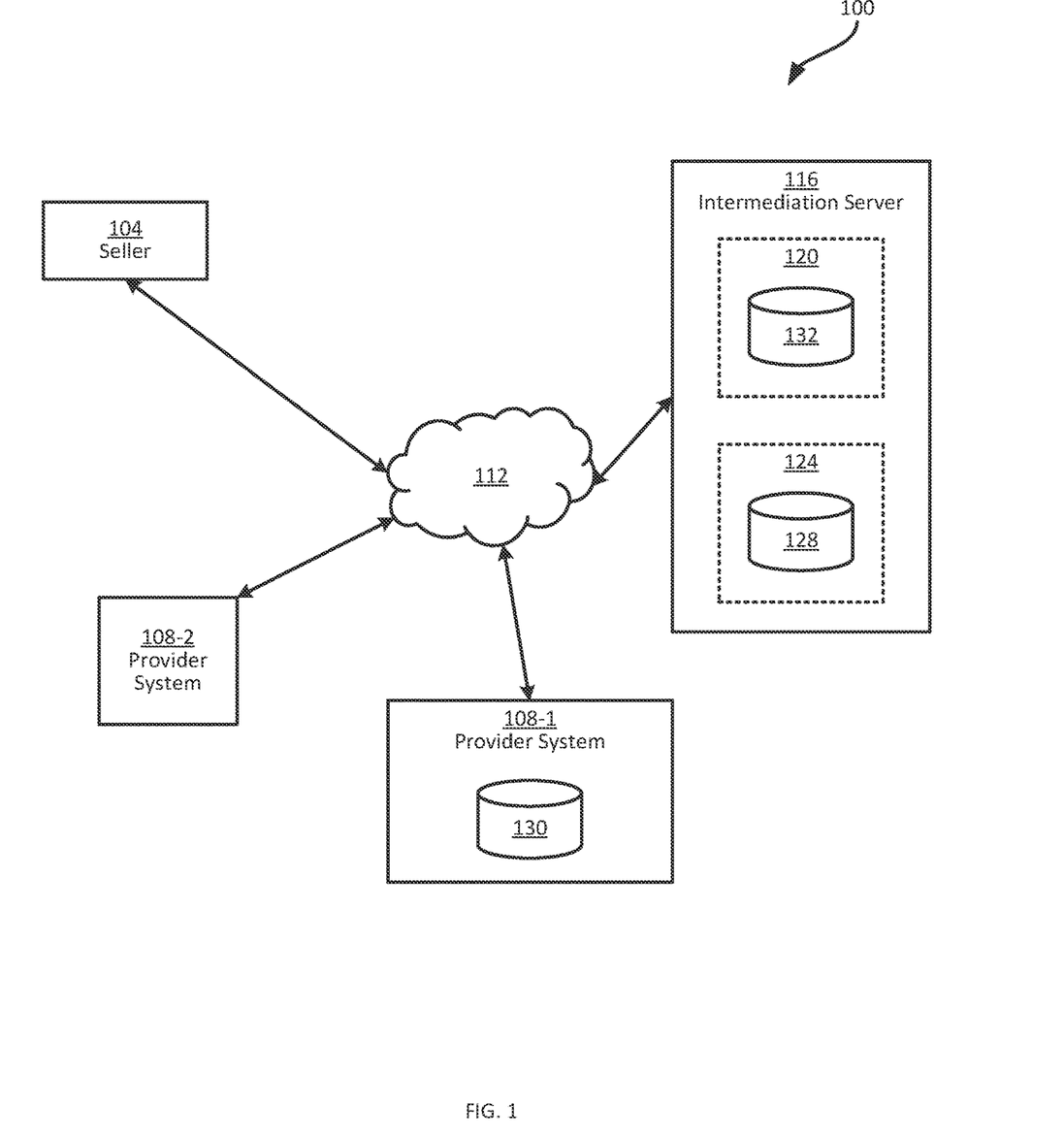
FIG. 1 depicts a system for request handling.

FIG. 1 depicts a system 100 for handling data requests. In general, handling data requests in this context refers to the receipt of a request, and the processing of that request (typically by consulting one or more other sources of data) to generate a response to provide to the computing device that originated the request.

More specifically, in the illustrated example the requests discussed herein are generated by a requesting device 104 (a single requesting device 104 is shown, but the system 100 can include any number requesting devices 104). The requests, in the examples discussed below, are requests for information describing travel-related products and services, such as flights, hotel reservations, vehicle rentals, and the like (generally referred to as items). The requesting device 104 can be a direct consumer of such products and services (e.g. an individual traveler), or an intermediate such as a travel agent. In the present example, the requesting device is assumed to be operated by a travel agency (e.g. an online travel agency, OTA), and is therefore also referred to as a seller 104 (because the seller 104 retrieves information about the above-mentioned products and services, to sell to the consumer).

The requests originated by the seller 104 include various options and attributes defining desired characteristics of the products and services to be returned to the seller 104. Examples of such attributes include times and dates, origin and destination locations, and the like. The response(s) to such requests include data defining products or services that satisfy the above-mentioned attributes. The response data, which may be referred to as shopping recommendations, offers or the like, depends at least in part on product and service characteristics generated by providers, such as airlines or the like. Each provider may operate a provider system. Two example provider systems 108-1 and 108-2 are shown in FIG. 1 (collectively referred to as provider systems 108 and generically referred to as a provider system 108). Each provider system 108 includes one or more computing devices that implement various processes enabling the computation and presentation of shopping recommendations, as well as the delivery of the products and services to customers.

In previous arrangements, responses are not generated at the provider systems 108 themselves. Instead, the above-mentioned provider data (e.g. schedules, fares, distribution rules for the fares, and the like) is published by the provider systems 108 to third party repositories. Requests from the seller 104 are directed, via a network 112 (i.e. any suitable combination of local-area and wide-area networks, including the Internet) are directed to such third parties, whether directly from the seller 104 or via one or more intermediate systems. Responses are therefore not generated by the provider systems 108. Instead, the provider systems 108 are contacted only when a purchase of a product or service is initiated (e.g. from among a number of possible products and services from one or more providers sent to the seller 104 in a response).

The above third-party publishing model, however, limits the ability of providers 108 to apply dynamic adjustments to product and service characteristics (e.g. price), in response to specific request attributes. The above limitations can arise, for example, from the frequency of publishing, which may not be sufficiently frequent to accommodate a desired frequency of changes to dynamic adjustment rules. In some operational models, therefore, such as the model contemplated in the New Distribution Capability (NDC) standard, provider systems 108 are direct recipients of requests. That is, rather than publishing product and service data to third parties (independently of any particular request), for computation of responses by the third party itself or another system, the provider systems 108 may store product and service data locally, receive requests directly from the seller 104, and compute responses to the requests.

Although the arrangement in which the provider systems 108 are directly responsible for responding to data requests from sellers 104 enables the provider systems 108 to exert finer-grained control over the generation of responses, it also requires that the provider systems 108 process a significantly greater number of requests than in the previously discussed model. Further, a large majority of those requests do not lead to purchases, and substantial infrastructural costs may therefore be incurred by the provider systems 108.

The system 100 therefore includes certain additional features to enable the processing of requests from the seller 104 in a manner that provides the granularity mentioned above in connection with the NDC-based model, while limiting the computational load on the provider systems 108 that is typically imposed by providing such granularity.

Specifically, the system 100 includes an intermediation server 116 (also simply referred to herein as the server 116) that includes a request handler 120 and a hosted offer management subsystem (OMS) 124. Although the OMS 124 is shown in FIG. 1 as being implemented at the server 116, in other examples the OMS 124 can be implemented in a separate computing device (or collection of linked computing devices) in communication with the server 116. As will be discussed below, the OMS 124 is hosted at the server 116 on behalf of the provider 108-1; in other embodiments, the OMS 124 can be deployed at the provider 108-1 itself, instead of at the server 116 on the provider's behalf.

The OMS 124 hosts a repository 128, which may be implemented as any suitable number of repositories (which may also be implemented as distinct but intercommunicating subsystems), containing data employed in responding to requests from the seller 104. For example, the repository 128 can contain the schedules and fares mentioned earlier. The OMS 124 can also contain, in addition to or instead of some or all provider data, instructions for retrieving provider data from other sources (not shown) and rules for generating baseline responses to requests. Still further, the OMS 124 can contain rules for generating adjustments to baseline responses under certain conditions.

Examples of such adjustments can include dynamic adjustments to pricing data, addition of ancillary products and services (i.e. beyond those explicitly requested in the request from the seller 104), and the like. Information employed to perform such adjustments may be generally referred to as auxiliary data (i.e. beyond the data employed to generate baseline replies to requests). The provider system 108 itself may also include, for example in a repository 130, auxiliary data that is not stored at the OMS 124. The auxiliary data in the repository 130 may include, for example, additional rules for pricing or service adjustments, multimedia content, or the like. In other examples, the repository 130 can be omitted (i.e. all data employed in response generation can be hosted at the OMS 124).

The data in the repository 128 is deployed to the OMS 124 by at least one of the providers 108. For example, the provider 108-1 is assumed to have deployed data to the OMS 124; that is, the server 116 hosts offer management services for the provider 108-1, rather than the OMS 124 being deployed at the provider 108-1. In other embodiments, the OMS 124 is implemented within the provider 108-1, rather than hosted at the server 116. The request handler 120 includes a provider profile repository 132 containing indications, for at least one of the providers 108, of request attributes for which a hosted provider 108 (i.e. the provider 108-1 in this example) is capable of responding to requests via a direct distribution channel such as NDC, and. For requests that are eligible for direct distribution, the provider 108 has typically, but not necessarily, deployed auxiliary data to the OMS 124. Requests that are eligible for direct distribution may therefore also be eligible for auxiliary content. In other words, the profile repository 132 contains indications that enable the request handler 120 to determine which incoming requests are eligible for direct processing by the OMS 124 to generate auxiliary content, such as the above-mentioned dynamic pricing.

As will be discussed in greater detail below, requests from the seller 104 are directed not to the provider systems 108, but to the server 116. The request handler 120 processes each request by comparing the request to the profile repository 132 to determine whether the request is eligible for direct distribution, e.g. via the NDC channel as noted above, and therefore whether the request may also be eligible for auxiliary content from each provider system 108. When the request is eligible, the request handler 120 marks any response data corresponding to that provider system 108 as direct distribution-eligible, which causes the seller 104 to direct subsequent requests directly to the relevant provider system 108. In addition, the request handler 120, when the request is eligible for direct distribution from a given provider system 108 (and may therefore also be eligible for auxiliary content), can also generate adjustments to baseline response data before responding to the request. That is, the request handler 120 can communicate with the OMS 124 not only to generate baseline response data, but also to generate adjusted response data, providing at least a degree of additional granularity to the response without imposing the computational load of response generation on the provider system 108.

Before further discussion of the functionality of the various components of the system 100, certain internal components of the provider system 108-1 and the intermediation server 116 will be described in connection with FIG. 2.

Figure 2:
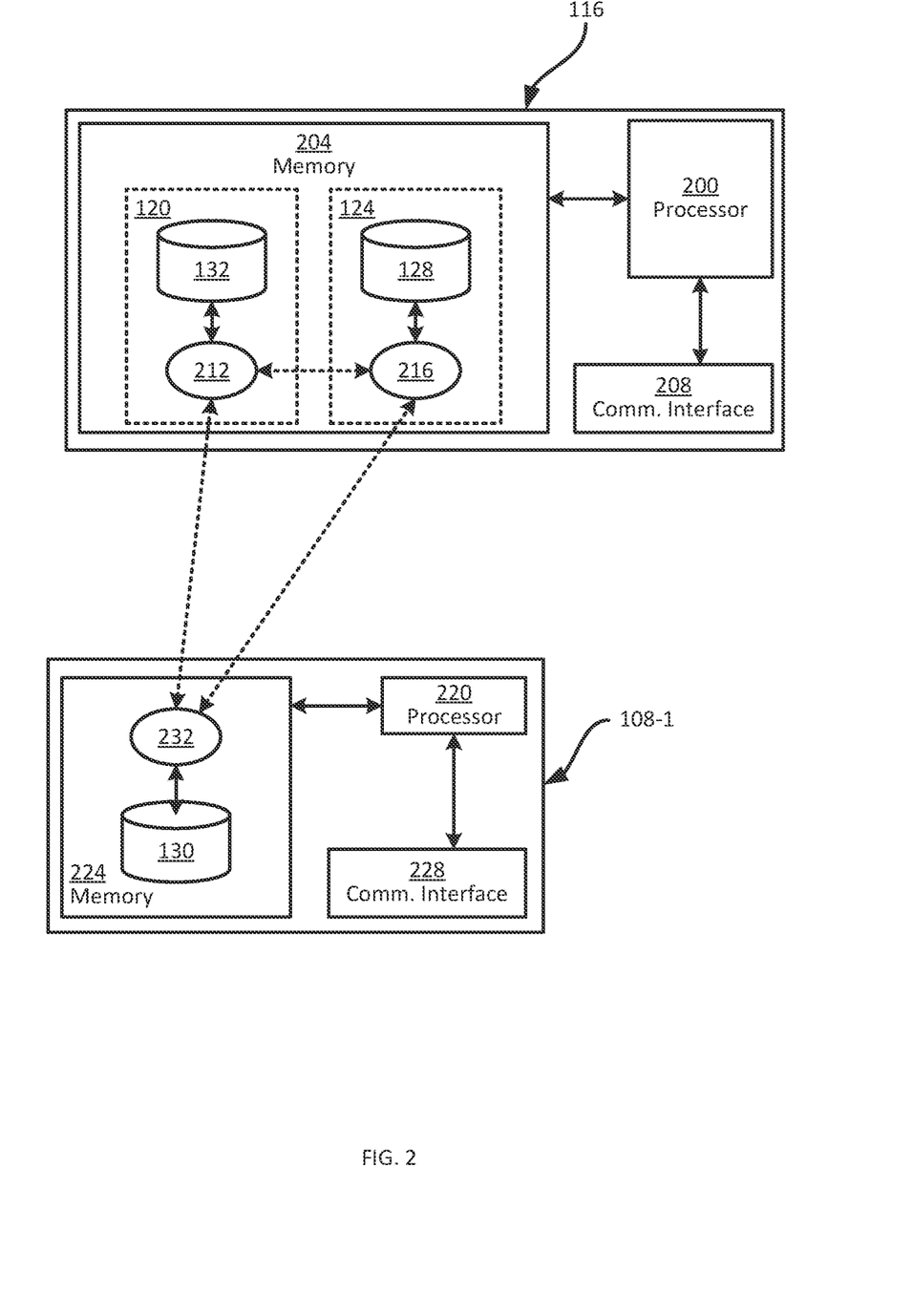
FIG. 2 depicts certain components of the intermediation server and a provider system of FIG. 1.

Turning to FIG. 2, the intermediation server 116 includes at least one processor 200, such as a central processing unit (CPU) or the like, The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communication interface 208, which enables the server 116 to communicate with the other computing devices of the system 100 via the network 112. The communication interface 208 therefore includes any necessary components (e.g. network interface controllers (NICs), radio units, and the like) to communicate via the network 112. The specific components of the communication interface 208 are selected based on the nature of the network 112. The server 116 can also include input and output devices connected to the processor 200, such as keyboards, mice, displays, and the like (not shown).

The components of the server 116 mentioned above can be deployed in a single enclosure, or in a distributed format. In some examples, therefore, the server 116 includes a plurality of processors, either sharing the memory 204 and communication interface 208, or each having distinct associated memories and communication interfaces.

The memory 204 stores data defining the request handler 120 and the OMS 124 as shown in FIG. 1. In particular, the memory 204 stores the repositories 128 and 132, as well as a plurality of computer-readable programming instructions, executable by the processor 200, in the form of various applications. The applications include a request handling application 212 (also referred to herein simply as the application 212) and an offer generation application 216 (also referred to herein simply as the application 216). As will be understood by those skilled in the art, the processor 200 executes the instructions of the applications 212 and 216 (and any other suitable applications) in order to perform various actions defined by the instructions contained therein. In the description below, the processor 200, and more generally the server 116, are said to be configured to perform those actions. It will be understood that they are so configured via the execution (by the processor 200) of the instructions of the applications stored in memory 204.

As also illustrated in FIG. 2, the provider system 108-1 includes at least one processor 220, such as a CPU or the like. The processor 220 is interconnected with a memory 224, implemented as a suitable non-transitory computer-readable medium (e.g. a suitable combination of non-volatile and volatile memory subsystems). The processor 220 and the memory 224 are generally comprised of one or more ICs. The processor 220 is also interconnected with a communication interface 228, which enables the provider system 108-1 to communicate with the other computing devices of the system 100 via the network 112.

The memory 224 stores the repository 130, as well as an application 232 executable by the processor 220 to interact with the server 116 to process requests from the seller 104. In particular, as shown in FIG. 2, both the request handler 120 (as implemented by the application 212) and the application 232 are configured to communicate with the OMS 124 (as implemented by the application 216). In addition, the request handler 120 directs a subset of the incoming requests from the seller 104 to the application 232 for processing (but, of particular note, not all requests from the seller 104). As noted above, in other examples the OMS 124 can be deployed at the provider 108-1 rather than hosted at the server 116. In such examples, the OMS 124 (i.e. the application 216 and the repository 128) are located in the memory 224 rather than at the memory 204 of the server 116.

Figure 3:
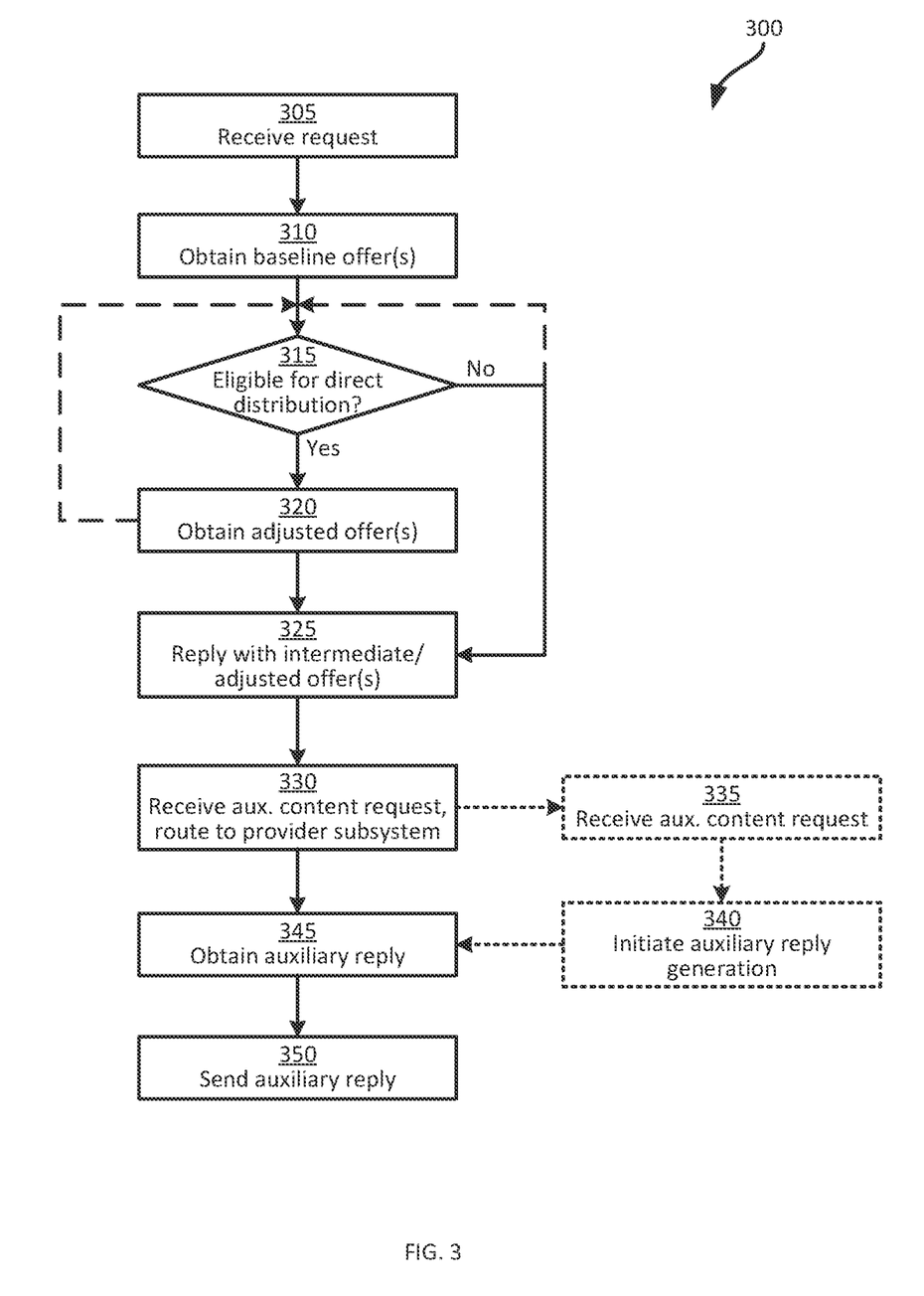
FIG. 3 depicts a method of request handling in the system of FIG. 1.

Turning now to FIG. 3, certain aspects of the operation of the system 100 will be described in greater detail. Specifically, FIG. 3 illustrates a method 300 of processing requests from the seller 104 while mitigating computational load on the provider systems 108. The method 300 will be described in conjunction with its performance within the system 100. In particular, certain blocks of the method 300 are performed at the server 116 via the execution of the applications 212 and 216 by the processor 200. Other blocks are performed by the provider system 108-1, via the execution of the application 232 by the processor 220.

Figure 4:
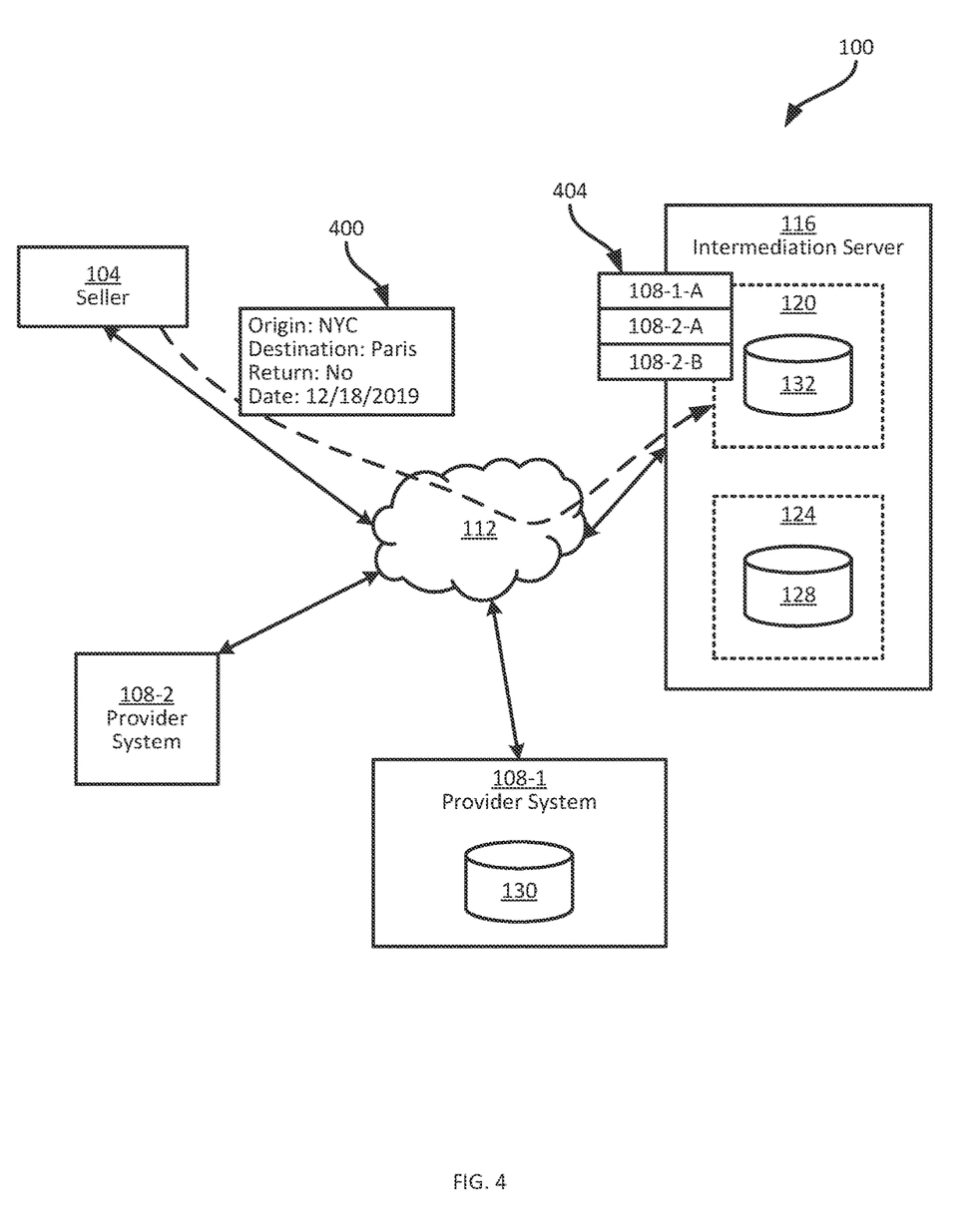
FIG. 4 depicts an example performance of blocks 305 and 310 of the method of FIG. 3.

At block 305, the request handler 120 receives a request from the seller 104 via the network 112. The request can be transmitted to the request handler 120 via any suitable interface (e.g. an API exposed by the server 116 or the like). The request includes request attributes that, as mentioned earlier, define desired characteristics of products and services to be returned to the seller 104. Turning briefly to FIG. 4, an example request 400 is shown. The request 400, which may be referred to as a shopping request, includes origin, destination, and date attributes for flights, as well as an indication that a return flight is not requested (i.e. the request 400 is for one-way flights).

Returning to FIG. 3, at block 310, having received the request 400, the request handler 120 obtains baseline offers corresponding to the request 400. The baseline offers, which may also be referred to as intermediate offers, are obtained by the request handler 120 by retrieving data from either or both of the OMS 124 and external sources (e.g. of information published by the provider systems 108 to third party repositories). For example, the request handler 120 can transmit a request to the OMS 124 for records (for any provider system 108 represented in the OMS 124) representing items matching the attributes of the request 400. The request handler 120 may also retrieve rules from the OMS 124 corresponding to the provider systems 108 and controlling access to the above records (e.g. defining that the seller 104 must have a particular geographic location in order to receive a response including a given item that has the requested attributes).

Referring again to FIG. 4, a set 404 of three example baseline offers are shown. For example, the baseline offer 108-1-A represents a flight offered by the operator of the provider system 108-1, and the baseline offers 108-2-A and 108-2-B represent flights offered by the operator of the provider system 108-2. The baseline offers 404 are defined, for example, by dates and times, as well as prices.

Having generated the baseline offers 404, the request handler 120 does not yet return the baseline offers 404 to the seller 104. Instead, returning to FIG. 3, the request handler 120 determines, at block 315, whether the request is eligible for direct distribution (and therefore may be eligible for auxiliary content) from any providers represented in the profile repository 132 (typically, providers represented in the repository 132 are those for whom provider data is hosted in the OMS 124). For example, the request handler 120 can retrieve records from the repository 132 corresponding to any provider represented in the set 404 of baseline offers. In the present example, it is assumed that the repository 132 contains records for both the provider systems 108-1 and 108-2, as shown below in Table 1.

TABLE 1

Example Profile Repository 132

| Provider | NDC-capable? | Criteria |
|---|---|---|
| 108-1 | Yes | Origin = NYC |
| 108-2 | No | N/A |

As seen above, the repository 132 indicates that the provider system 108-2 is not NDC-capable (or, more generally, does not support direct distribution or provide auxiliary content). The provider system 108-1, however, does support direct distribution and therefore can be contacted via a direct distribution channel to handle the request, including by providing auxiliary content. However, the provider system 108-1 provides auxiliary content only for requests satisfying certain criteria. In this example, the provider system 108-1 has deployed auxiliary content to the OMS 124 for application to any request with an origin location of New York City. Because the request 400 matches the origin indicated in Table 1, the determination at block 315 for the provider system 108-1 is affirmative. A wide variety of other criteria may also be defined in the repository 132. Another example of such a criterion is a point-of-sale criterion, specifying one or more geographic regions to be compared with the geographic location of the seller 104. If the seller 104 has a location matching the above criteria, then the request is eligible for auxiliary content.

Following an affirmative determination at block 315, at block 320 the request handler 120 obtains an adjusted offer. Specifically, in the present example, the request handler obtains adjustments to the offer 108-1-A shown in FIG. 4. The mechanism by which the adjusted offer is obtained, in the present example, includes transmitting the baseline offer 108-1-A to the OMS 124 along with a request for auxiliary content. The OMS 124 processes the request, e.g. to determine whether to supplement the baseline offer 108-1-A with ancillary services, whether to adjust the price of the baseline offer 108-1-A, or the like. The OMS 124 can perform these determinations and return the results thereof to the request handler 120, or the OMS 124 can return rules and source data for making the determinations to the request handler 120, and the request handler 120 itself can determine whether any adjustments apply.

Figure 5:
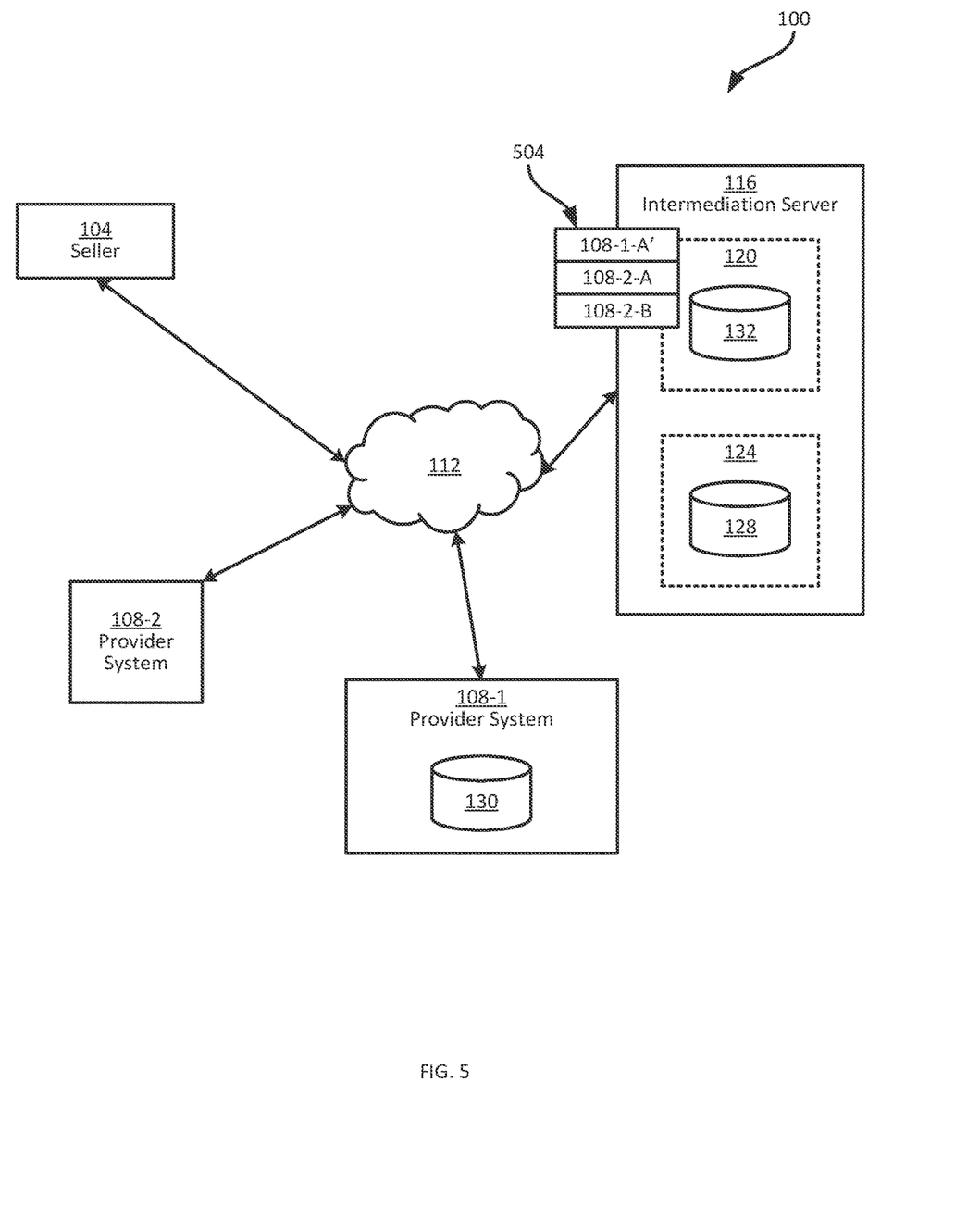
FIG. 5 depicts an example performance of blocks 315 and 320 of the method of FIG. 3.

The request handler 120 repeats the determination at block 315, and if applicable the performance of block 320, for each provider 108 represented in the set 404 of baseline offers (as indicated by the dashed lines from blocks 315 and 320). In the present example, as will be apparent from Table 1, the determination at block 315 for the provider system 108-2 is negative. Therefore, block 320 is not performed for the baseline offers 108-2-A and 108-2-B. Turning to FIG. 5, an adjusted set of offers 504 is shown, in which the baseline offer 108-1-A has been replaced with an adjusted offer 108-1-A'. For example, the adjusted offer 108-1-A' may include a discounted price relative to the baseline offer 108-1-A. The baseline offers 108-2-A and 108-2-B are unchanged.

Figure 6:
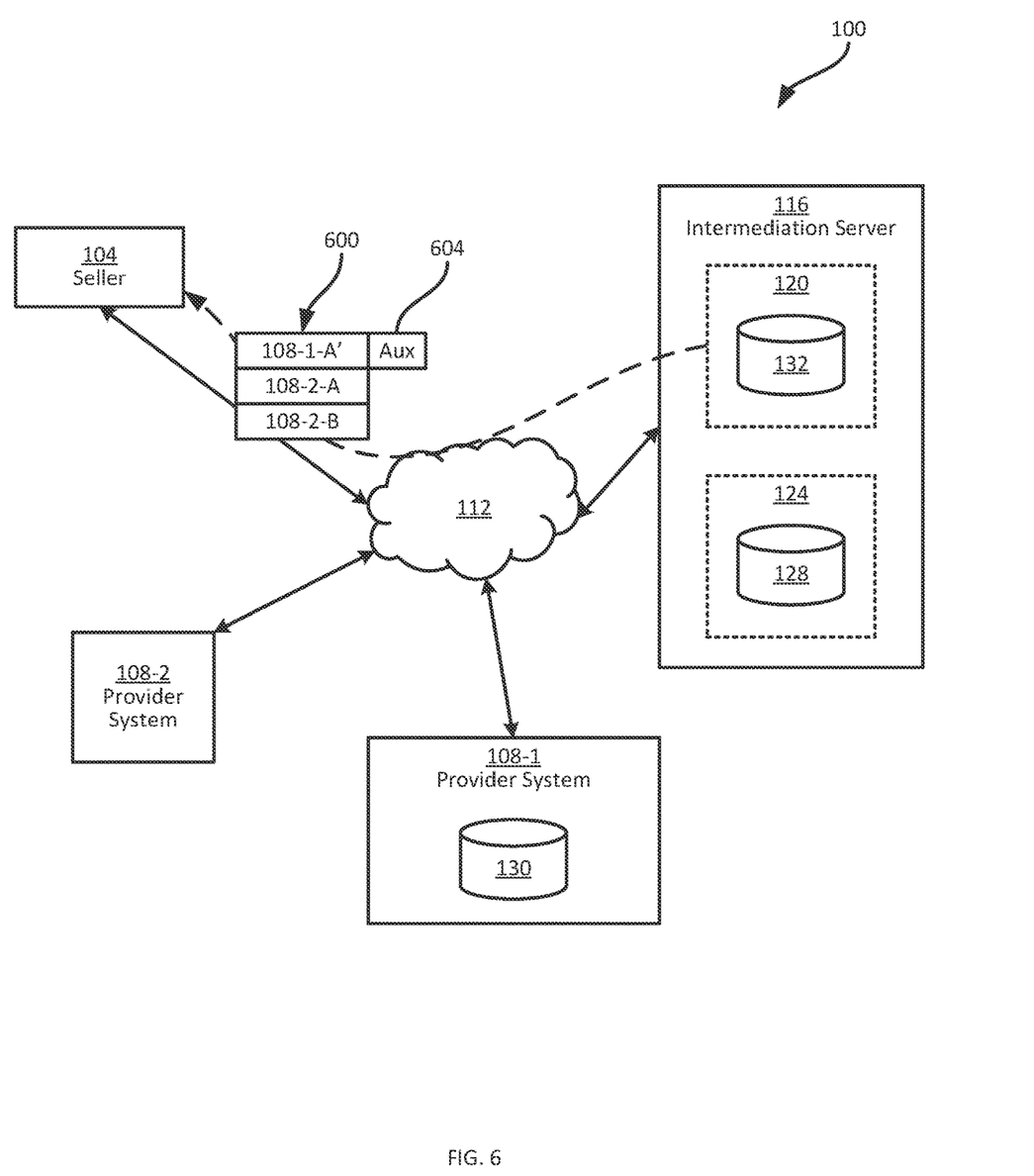
FIG. 6 depicts an example performance of block 325 of the method of FIG. 3.

At block 325, the request handler 120 sends a reply to the seller 104, containing the intermediate and/or adjusted offers resulting from the performance(s) of blocks 310, 315 and 320. In the present example, therefore, the set 504 of offers is transmitted to the seller 104 at block 325. In addition, any adjusted offers are marked in the response as being eligible for auxiliary content. For example, as shown in FIG. 6, a response 600 is transmitted to the seller 104 that includes the offers from FIG. 5, and a flag 604 associated with the adjusted offer 108-1-A'. The flag 604 can be a string of text, a graphic identifier, or a combination thereof, that indicates to the seller 104 not only that the adjusted offer 108-1-A' has been adjusted, but also that the adjusted offer 108-1-A' may be eligible for further adjustment, for example, via an NDC interaction with the provider system 108-1 itself.

The seller 104 is configured, responsive to receiving the offers sent by the request handler 120 at block 325, to present the offers (e.g. on a display or other suitable output assembly). The seller 104 is configured to receive selections of one or more offers to obtain further details and/or initiate a purchase of the items defined by the selected offers. For offers that are not eligible for auxiliary content, subsequent processing can be performed, for example, by transmitting a booking request to the request handler from the seller 104.

Subsequent processing for offers that are eligible for auxiliary content, however, is performed beginning at block 330. In particular, at block 330, assuming that the seller 104 has received a selection of an adjusted offer (i.e. an offer that is eligible for auxiliary content), the request handler 120 receives an auxiliary content request. The auxiliary content request may be distinguished from the initial shopping request by data structure or any other suitable mechanism. For example, the seller 104 can be configured to transmit the request received at block 330 formatted according to the NDC standard (e.g. as an OfferPrice request). The request for auxiliary content received at block 330 can include the content of the original offer (i.e. the adjusted offer sent at block 325). In some examples, the request received at block 330 includes, in addition to or instead of the actual offer content, an identifier of the offer content that is also stored in the OMS 124.

Figure 7:
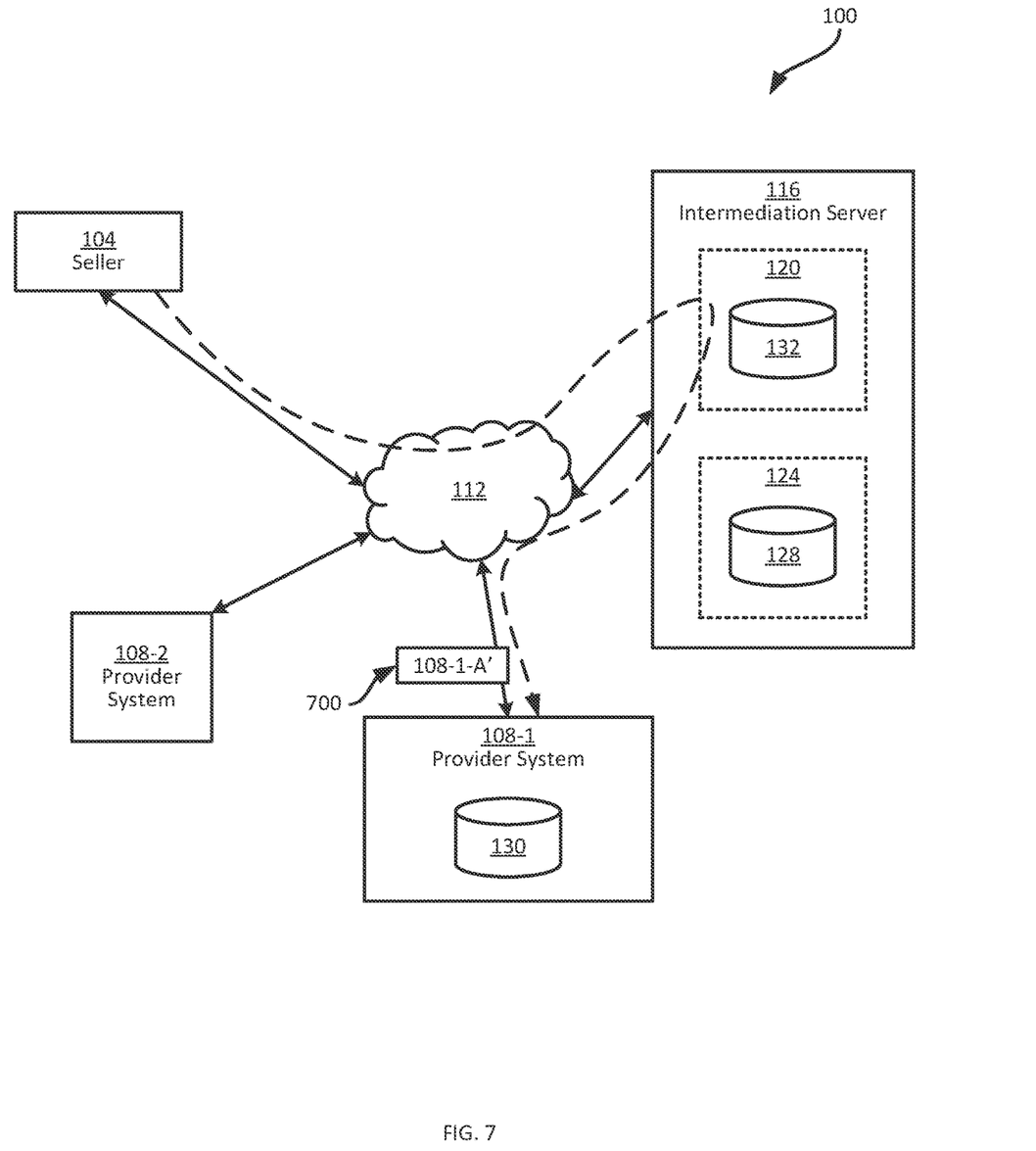
FIG. 7 depicts an example performance of block 330 of the method of FIG. 3.

When the request handler 120 receives the auxiliary content request, the request is routed to the relevant provider system 108 for processing, FIG. 7 illustrates the receipt of a request 700 at the request handler 120, followed by routing of the request 700 to the provider system 108-1. The provider system 108-1, in turn, is configured to receive the auxiliary content request 700 (as shown in dashed lines at block 335 of FIG. 3), and to initiate the generation of an auxiliary reply (as shown at block 340 of FIG. 3).

Figure 8:
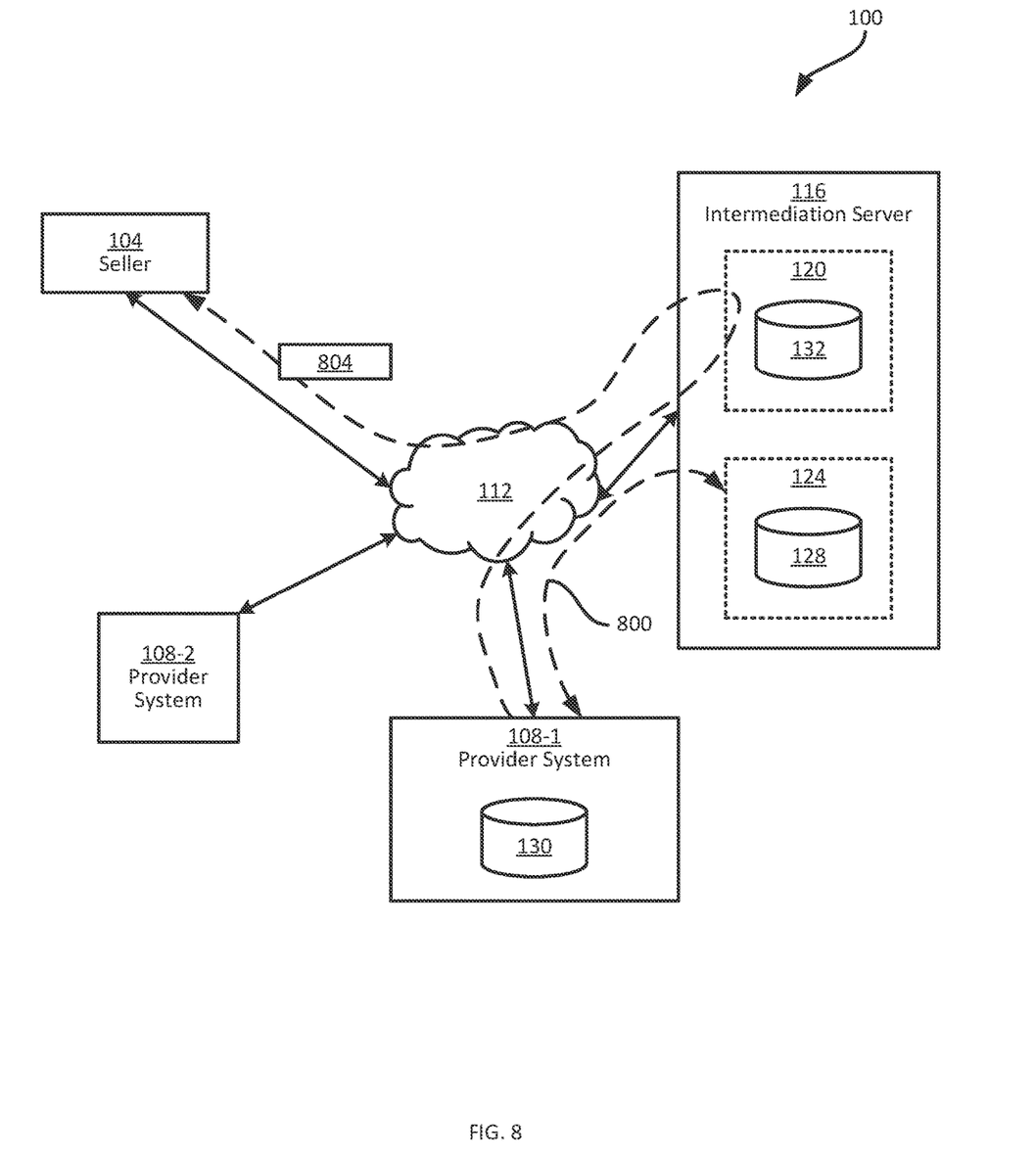
FIG. 8 depicts an example performance of blocks 335 to 350 of the method of FIG. 3.

The provider system 108-1, to generate the auxiliary reply, can retrieve content from the repository 130, and can also request data from the OMS 124. FIG. 8, or example, illustrates an exchange 800 between the provider system 108-1 and the OMS 124. That is, the OMS 124 is employed by both the request handler 120 to generate baseline offers (independently of the provider systems 108) and the provider system 108-1 to generate auxiliary replies for offers that have been selected for further processing at the seller 104.

The auxiliary reply can include, for example, a further adjusted price, additional ancillary services (i.e. beyond those mentioned earlier), or the like. The provider system 108-1, having generated the auxiliary reply, returns the auxiliary reply to the request handler 120. In other words, the request handler 120 obtains the auxiliary reply at block 345. At block 350, the request handler 120 transmits the auxiliary reply to the seller 104. FIG. 8 illustrates an auxiliary reply 804 being transmitted to the seller 104 via the request handler 120. The auxiliary reply 804 can be transmitted according to the same data structure as the auxiliary content request 700 (e.g. formatted according to the NDC standard, as an OfferPrice reply).

As will now be apparent, additional processing of the auxiliary reply, e.g. to finalize a purchase of the item(s) defined therein, can be performed between the seller 104 and the provider system 108-1, with the request handler 120 simply routing communications between the seller 104 and the provider system 108-1.

As will be understood from the discussion above, the system 100 enables the application of granularity to certain seller requests, while minimizing the number of requests that are processed by the provider system 108-1 itself. In particular, the shared use of the OMS 124 by the request handler 120 and the provider system 108-1 enables the generation of baseline and adjusted offers that reflect at least a degree of the desired granularity, without any direct involvement by the provider system 108-1. The provider system 108-1 is required to process requests directly only responsive to second requests (i.e. auxiliary content requests), which are less numerous that shopping requests such as the request 400, and which are also more likely to indicate an impending booking.

Those skilled in the art will appreciate that in some embodiments, the functionality of any of the applications 212, 216 and 232 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method comprising:
receiving, at an intermediation server, a request containing requested item characteristics for items provided by a set of provider systems;
generating, at the intermediation server, an intermediate reply defining a set of items matching the characteristics in the request, the set of items provided by a subset of the provider systems;
determining, at the intermediation server, that a first item of the set of items is eligible for provider-specific adjustment;
generating, at the intermediation server, an adjusted reply by:
communicating with a hosted offer management system to receive instructions for adjusting the first item in the intermediate reply, the hosted offer management system providing hosted provider object services for the provider systems; and
adjusting, at the intermediation server, the first item in the intermediate reply based on the instructions, to generate an adjusted first item; and
providing, from the intermediation server, the adjusted reply in response to the request, the adjusted reply defining (i) the adjusted first item, and (ii) a remainder of the set of items defined in the intermediate reply, excluding the first item.

2. The method of claim 1, wherein adjusting the first item comprises adjusting one or more of:
a price of the first item; and
services associated with the first item.

3. The method of claim 1, wherein the request comprises a shopping request.

4. The method of claim 1, wherein the generating the intermediate reply is based on data defining rules for generating baseline offers corresponding to the set of items, the data including at least one of (i) information electronically published by the provider systems or (ii) information provided from the provider systems to the intermediation server.

5. The method of claim 4, wherein the instructions received from the hosted offer management system represent rules for adjusting a first one of the baseline offers corresponding to the first item.

6. The method of claim 1, further comprising:
receiving a further request at the intermediate server, the further request identifying at least one item from the adjusted reply; and
initiating a purchase of the at least one item.

7. The method of claim 6, further comprising:
determining that the at least one item is the adjusted first item; and
prior to initiating the purchase:
(i) communicating with at least one of the provider system to receive auxiliary content associated with the adjusted first item; and
(ii) providing, to the requesting device, an auxiliary reply in response to the further request.

8. The method of claim 1, further comprising, at the intermediation server:
retrieving respective provider profiles for the subset of providers; and
determining whether any of the set of items is eligible for provider-specific adjustment based on the retrieved provider profiles.

9. The method of claim 8, wherein determining whether any of the set of items is eligible for provider-specific adjustment includes determining whether any of the subset of provider systems is capable of providing New Distribution Capability (NDC) content corresponding to the request.

10. An intermediation server, comprising:
a communications interface;
a processor connected with the communications interface, the processor configured to:
receive, via the communications interface, a request containing requested item characteristics for items provided by a set of provider systems;
generate an intermediate reply defining a set of items matching the characteristics in the request, the set of items provided by a subset of the provider systems;
determine that a first item of the set of erns is eligible for provider-specific adjustment
in order to generate an adjusted reply:

communicate with a hosted offer management system to receive instructions for adjusting the first item in the intermediate reply, the hosted offer management system providing hosted provider object services for the provider systems; and adjust the first item in the intermediate reply based on the instructions, to generate an adjusted first item;

provide the adjusted reply in response to the request, the adjusted reply defining (i) the adjusted first item, and (ii) a remainder of the set of items defined in the intermediate reply, excluding the first item.

11. The intermediation server of claim 10, wherein the processor is configured, in order to generate the adjusted reply, to adjust one or more of:

a price of the first item; and services associated with the first item.

12. The intermediation server of claim 10, wherein the request comprises a shopping request.

13. The intermediation server of claim 10, wherein the processor is further configured to:

determine that the at least one item is the adjusted first item; and prior to initiating the purchase:

(i) communicate with at least one of the provider system to receive auxiliary content associated with the adjusted first item, and (ii) provide, to the requesting device, an auxiliary reply in response to the further request.

14. The intermediation server of claim 10, wherein the processor is further configured to:

retrieve respective provider profiles for the subset of providers; and determine whether any of the set of items is eligible for provider-specific adjustment based on the retrieved provider profiles.

15. The intermediation server of claim 10, wherein the processor is configured, in order to generate the intermediate reply, to retrieve data defining rules for generation of baseline offers corresponding to the set of items, the data including at least one of (i) information electronically published by the provider systems or (ii) information provided from the provider systems to the intermediation server.

16. The intermediation server of claim 15, wherein the instructions received from the hosted offer management system represent rules for adjusting a first one of the baseline offers corresponding to the first item.

17. The intermediation server of claim 13, wherein the processor is further configured to:

receive a further request at the intermediate server, the further request identifying at least one item from the adjusted reply; and initiate a purchase of the at least one item.

18. The intermediation server of claim 17, wherein the processor is configured, in order to determine whether any of the set of items is eligible for provider-specific adjustment, to determine whether any of the subset of provider systems is capable of providing New Distribution Capability (NDC) content corresponding to the request.

19. A non-transitory computer-readable medium storing computer readable instructions executable by a processor of an intermediation server to:

receive, via a communications interface of the intermediation server, a request containing requested item characteristics for items provided by a set of provider systems;

generate an intermediate reply defining a set of items matching the characteristics in the request, the set of items provided by a subset of the provider systems;

determine that a first item of the set of items is eligible for provider-specific adjustment;

in order to generate an adjusted reply:

communicate with a hosted offer management system to receive instructions for adjusting the first item in the intermediate reply, the hosted offer management system providing hosted provider object services for the provider systems; and adjust the first item in the intermediate reply based on the instructions, to generate an adjusted first item; and provide, via the communications interface, the adjusted reply in response to the request, the adjusted reply defining (i) the adjusted first item, and (ii) a remainder of the set of items defined in the intermediate reply, excluding the first item.

\* \* \* \* \*